United States Patent
Hoshino

(10) Patent No.: US 10,855,859 B2
(45) Date of Patent: Dec. 1, 2020

(54) INFORMATION PROCESSING APPARATUS AND NON-TRANSITORY COMPUTER READABLE MEDIUM FOR OUTPUTTING INFORMATION TO CHANGE A SETTING ITEM

(71) Applicant: FUJI XEROX CO., LTD., Tokyo (JP)

(72) Inventor: Haruhisa Hoshino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/546,348

(22) Filed: Aug. 21, 2019

(65) Prior Publication Data

US 2020/0288027 A1  Sep. 10, 2020

(30) Foreign Application Priority Data

Mar. 5, 2019  (JP) .................................. 2019-039961

(51) Int. Cl.
 *H04N 1/00* (2006.01)
 *H04N 1/44* (2006.01)
 *H04L 29/06* (2006.01)

(52) U.S. Cl.
 CPC ..... *H04N 1/00503* (2013.01); *H04N 1/00482* (2013.01); *H04N 1/4406* (2013.01); *H04L 67/42* (2013.01); *H04N 2201/0094* (2013.01)

(58) Field of Classification Search
 None
 See application file for complete search history.

(56) References Cited

U.S. PATENT DOCUMENTS

| | | | | |
|---|---|---|---|---|
| 8,319,989 B2* | 11/2012 | Mizunashi | ............... | H04N 7/16 358/1.15 |
| 8,482,760 B2* | 7/2013 | Ito | ...................... | H04N 1/00209 358/1.13 |
| 2007/0133543 A1* | 6/2007 | Kawasaki | .......... | H04N 1/32064 370/392 |

FOREIGN PATENT DOCUMENTS

JP  2003-274102 A  9/2003

OTHER PUBLICATIONS

Machine translation of Japanese Pat. Publ. No. 2003274102 by Ochiai, published Sep. 2003.*

* cited by examiner

*Primary Examiner* — Paul F Payer
(74) *Attorney, Agent, or Firm* — Oliff PLC

(57) ABSTRACT

An information processing apparatus includes: a transmission unit that transmits an object to a particular external device connected to the apparatus; and a guidance output unit that predicts a setting item that should be changed in a case where the object is not transmitted to the particular external device, and that outputs guidance information that suggests changing the setting item.

6 Claims, 13 Drawing Sheets

FIG. 2

| TYPE OF ERROR | ERROR CODE | CAUSE OF ERROR | MEASURE | SCREEN INFORMATION |
|---|---|---|---|---|
| TRANSFER JOB ERROR | 123-456 | FOLLOWING FOLDER DID NOT EXIST IN Scan-To-PC (SMB) | CHANGE DESTINATION FOLDER | |
| TRANSFER JOB ERROR | 987-654 | NO ACCESS AUTHORITY TO FOLLOWING DESTINATION WAS GIVEN IN Scan-To-PC (SMB) | CHANGE LOG-IN USER NAME AND PASSWORD | |
| TRANSFER JOB ERROR | 333-444 | FOLLOWING SERVER COULD NOT BE LOGGED IN TO IN Scan-To-PC (SMB) | CHANGE LOG-IN USER NAME AND PASSWORD | |
| ... | ... | ... | ... | |

111

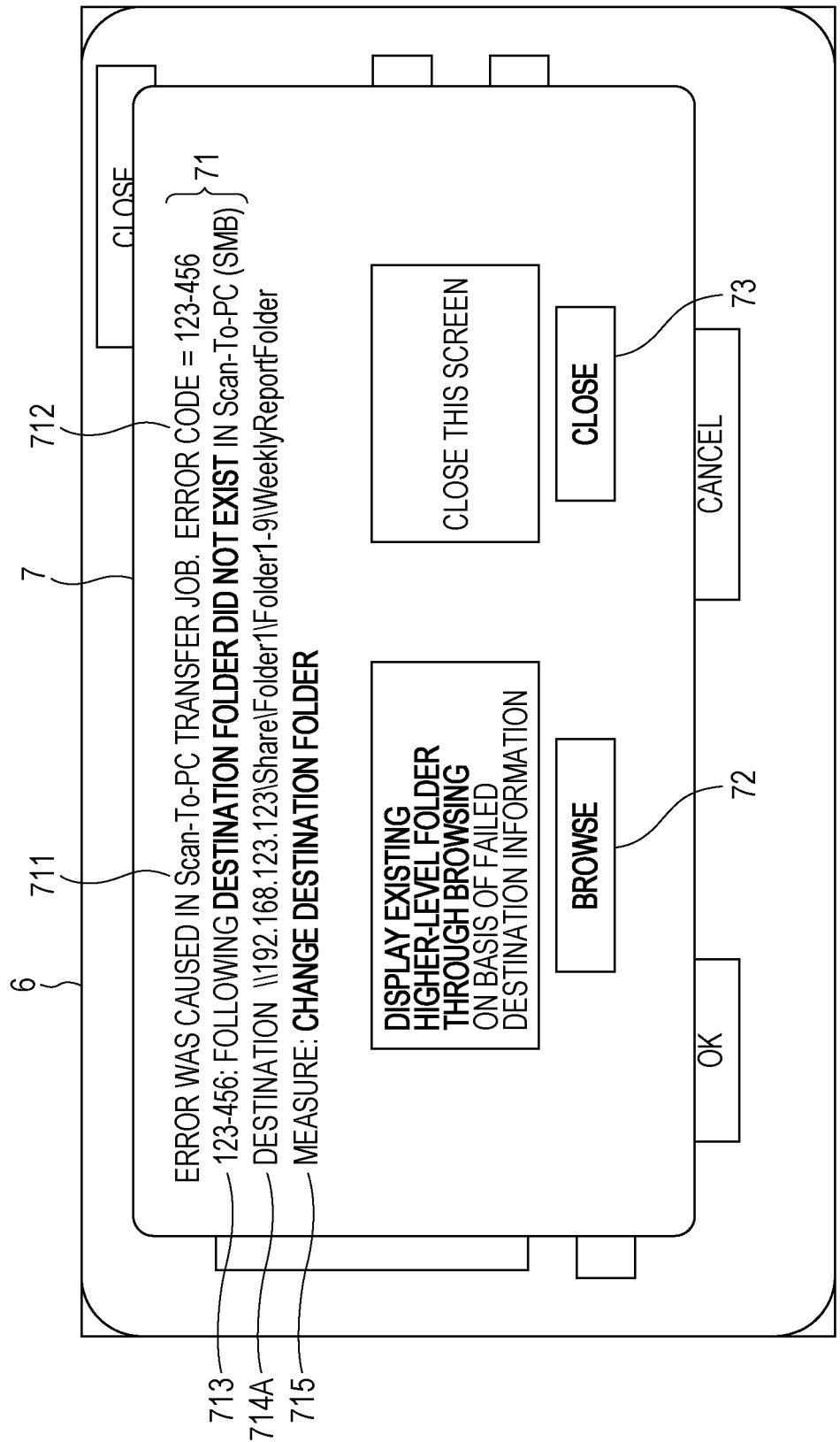

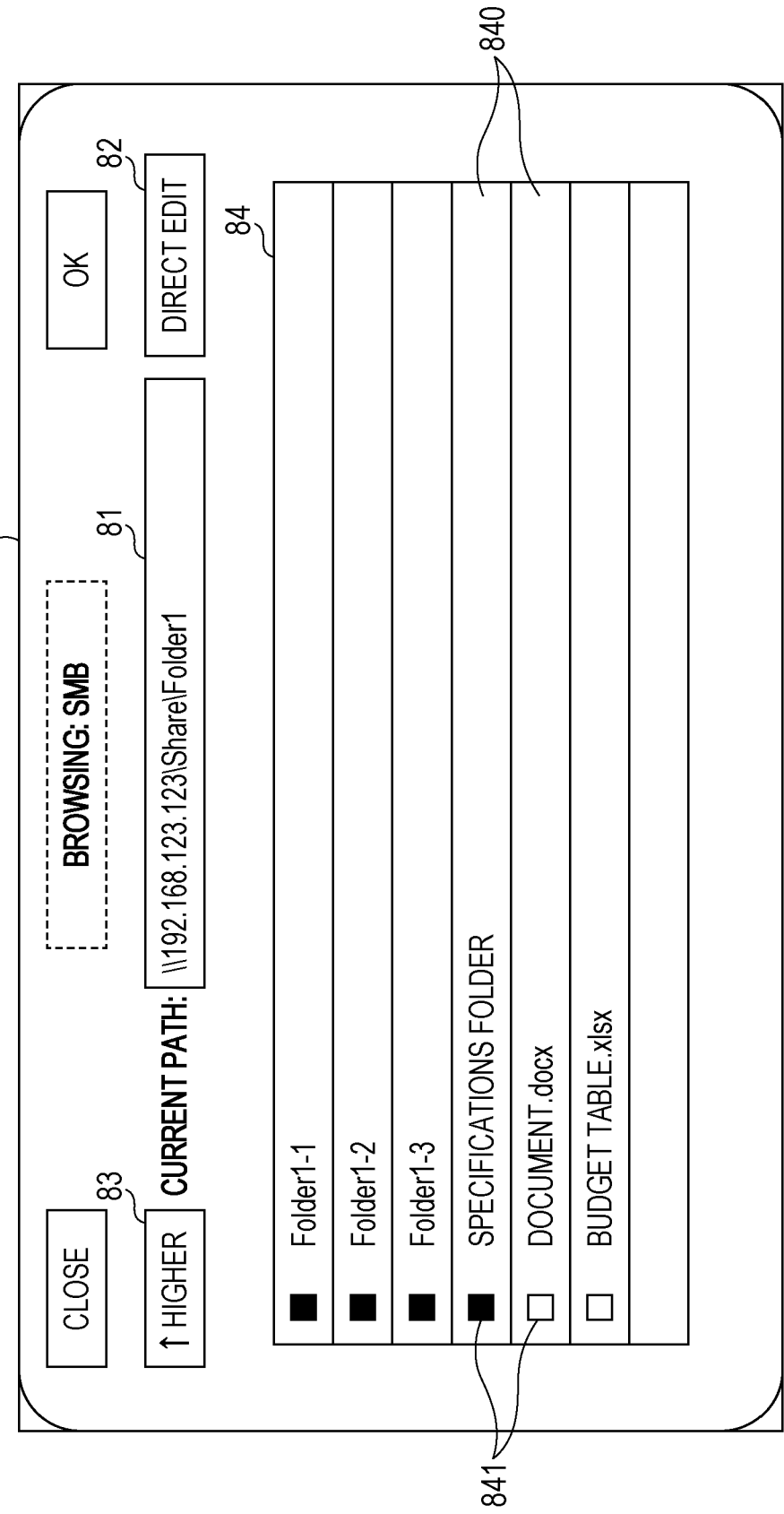

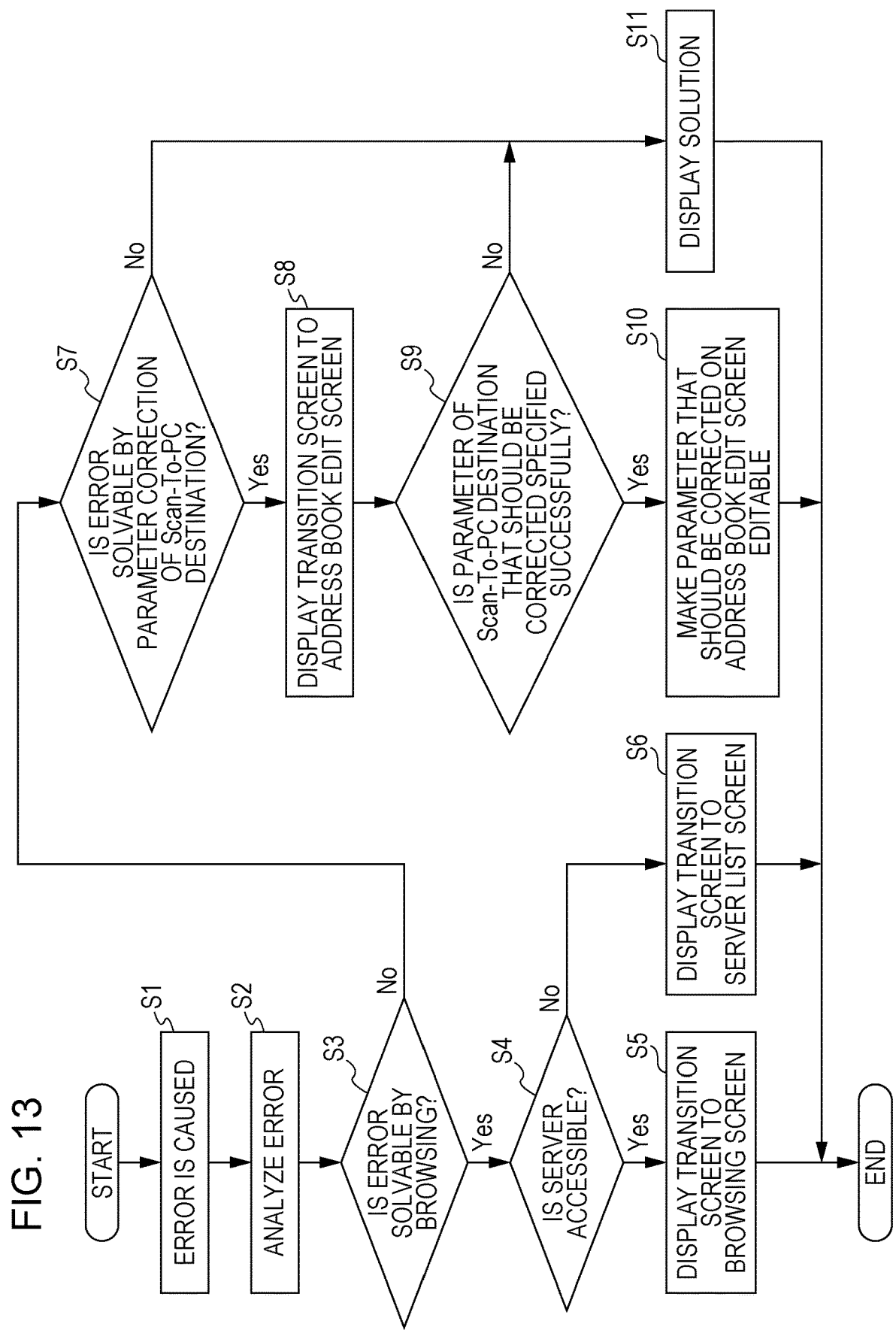

INFORMATION PROCESSING APPARATUS AND NON-TRANSITORY COMPUTER READABLE MEDIUM FOR OUTPUTTING INFORMATION TO CHANGE A SETTING ITEM

CROSS-REFERENCE TO RELATED APPLICATIONS

This application is based on and claims priority under 35 USC 119 from Japanese Patent Application No. 2019-039961 filed Mar. 5, 2019.

BACKGROUND (i) Technical Field

The present disclosure relates to an information processing apparatus and a non-transitory computer readable medium.

(ii) Related Art

In recent years, there has been proposed an information processing apparatus that facilitates setting of a destination that is required to transmit image data to a device on a network (see Japanese Unexamined Patent Application Publication No. 2003-274102, for example).

Japanese Unexamined Patent Application Publication No. 2003-274102 describes an information processing apparatus that includes a reading unit that reads an image recorded on a recording medium using a photoelectric conversion element, a transmission unit that transmits image data read using the photoelectric conversion element via a network, and a setting unit that sets a destination to which such data are to be transmitted by the transmission unit, the setting unit including a search unit that searches the network for the destination of the image data.

SUMMARY

In the case where an error is caused during execution of a process of transferring an object, it is occasionally necessary to resume the process after changing a setting item in accordance with the content of the error. In this event, a user is occasionally required to specify a setting item that should be changed.

Aspects of non-limiting embodiments of the present disclosure relate to providing an information processing apparatus and a non-transitory computer readable medium that enable setting of a setting item in accordance with error information, even without a user specifying a setting item that should be changed, in the case where an error is caused during execution of a process of transferring an object.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a transmission unit that transmits an object to a particular external device connected to the apparatus; and a guidance output unit that predicts a setting item that should be changed in a case where the object is not transmitted to the particular external device, and that outputs guidance information that suggests changing the setting item.

BRIEF DESCRIPTION OF THE DRAWINGS

An exemplary embodiment of the present disclosure will be described in detail based on the following figures, wherein:

FIG. 2 illustrates an example of an error information table;

FIG. 3 illustrates an example of a first error display screen;

FIG. 4 illustrates an example of a browsing screen;

FIG. 13 is a flowchart illustrating an example of operation of the information processing apparatus illustrated in FIG. 1.

DETAILED DESCRIPTION

Figure 1:
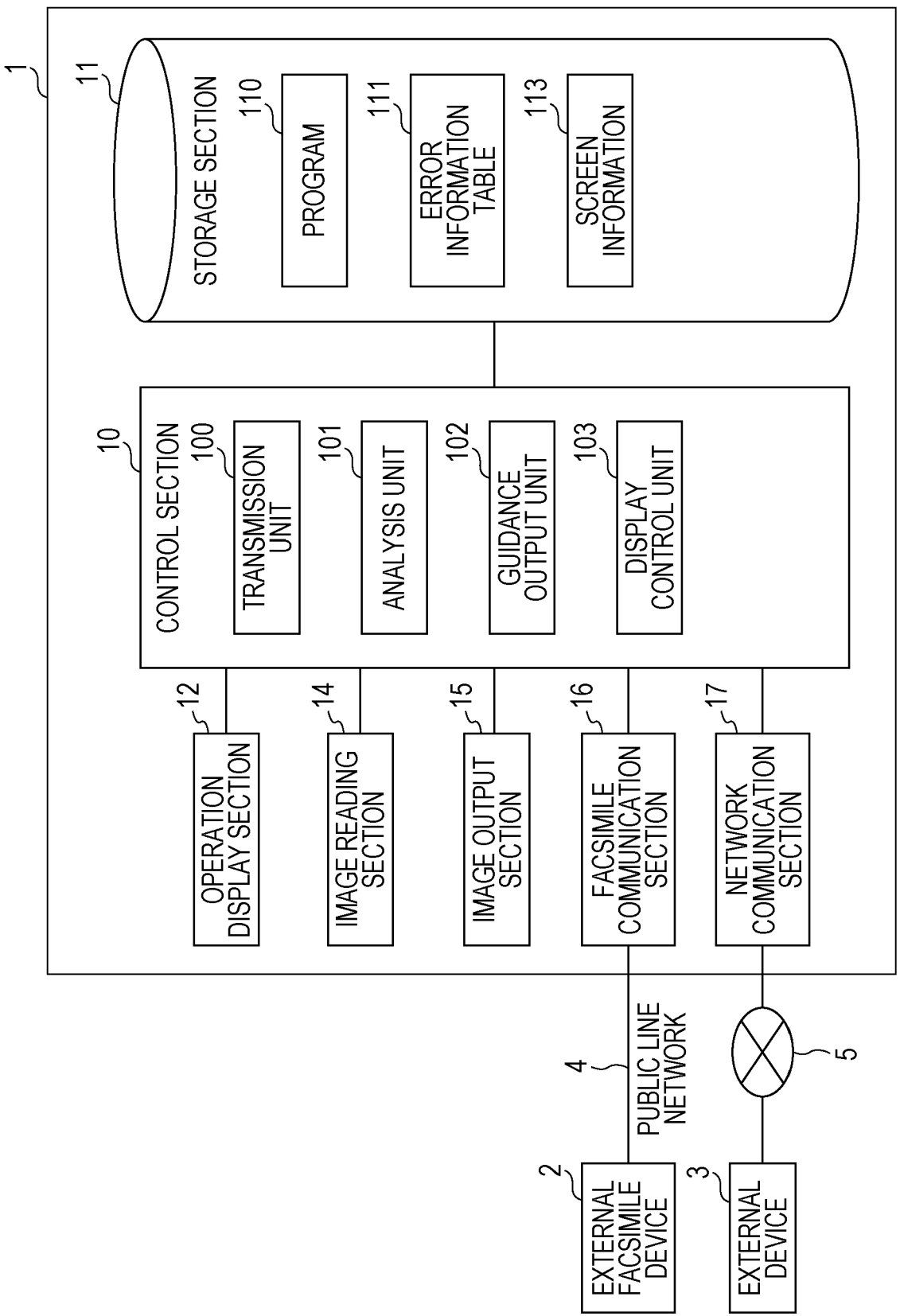
FIG. 1 is a block diagram illustrating an example of a control system of an information processing apparatus according to an exemplary embodiment of the present disclosure.

An exemplary embodiment of the present disclosure will be described below with reference to the drawings. In the drawings, constituent elements that have substantially the same function are denoted by the same reference numeral to omit redundant description.

Exemplary Embodiment (Configuration of Information Processing Apparatus)

FIG. 1 is a block diagram illustrating an example of a control system of an information processing apparatus according to an exemplary embodiment of the present disclosure. Examples of an information processing apparatus 1 include a personal computer, an image forming apparatus, a tablet terminal, a multi-function mobile phone (smartphone), etc. In the following, the information processing apparatus 1 is described as a multi-function device that has a plurality of functions such as a scan function, a printer function, a copy function, a facsimile function, and an electronic mail function, for example. However, the information processing apparatus 1 is not limited to a multi-function device.

The information processing apparatus 1 includes a control section 10 that controls various sections, a storage section 11 that stores various types of data, an operation display section 12 that allows input and display of information, an image reading section 14 that reads a document to generate a read image, an image output section 15 that prints and outputs an image, a facsimile communication section 16 that transmits and receives a facsimile to and from an external facsimile device 2 via a public line network 4, and a network communication section 17 that communicates with an external device 3 via a network 5.

The control section 10 is composed of a central processing unit (CPU), an interface, etc. The CPU operates in accordance with a program 110 stored in the storage section 11 to function as a transmission unit 100, an analysis unit 101, a guidance output unit 102, a display control unit 103, etc. The units 100 to 103 will be discussed in detail later.

The storage section 11 is composed of a read only memory (ROM), a random access memory (RAM), a hard disk, etc., and stores various types of data such as the program 110, an error information table 111 (see FIG. 2), and screen information 113. The error information table 111 and the screen information 113 will be discussed in detail later.

The operation display section 12 is a touch-screen display, for example, and includes a display such as a liquid crystal display and a touch screen superposed thereon.

The image reading section 14 reads a document image from a document, and includes a document platen (not illustrated), an automatic document feeding device (not illustrated) provided thereon, and a scanner (not illustrated). The image reading section 14 optically reads a document disposed on the document platen or fed by the automatic document feeding device to generate a read image. The read image is an example of an object.

The image output section 15 prints and outputs a color image or a monochrome image on a recording medium such as paper through an electrophotographic system, an inkjet system, etc.

The facsimile communication section 16 modulates and demodulates data in accordance with a facsimile protocol such as G3 or G4, and performs facsimile communication via the public line network 4.

The network communication section 17 is implemented by a network interface card (NIC) etc., and transmits and receives a signal to and from the external device 3 via the network 5. Examples of the external device 3 include a terminal device such as a personal computer, a server device (hereinafter also referred to simply as a "server"), etc. Examples of the network 5 include a local area network (LAN), a wide area network (WAN), the Internet, an intranet, etc. The network 5 may be either wired or wireless.

(Configuration of Units of Control Section 10)

Next, various units that constitute the control section 10 will be described in detail. The transmission unit 100 transmits a read image to the external device 3. In other words, the transmission unit 100 executes a process (hereinafter also referred to as a "Scan-To-PC process") of transferring a read image to the external device 3. The Scan-To-PC process is an example of a process of transferring an object. The read image may be taken in from the image reading section 14 discussed above, or may be taken in from an external device (such as a scanner or a camera, for example).

The analysis unit 101 acquires various types of information from the external device 3 and, in the case where there occurs an event (hereinafter also referred to simply as an "error") in which the read image may not be transmitted for some reason during execution of the Scan-To-PC process discussed above, analyzes the error in accordance with the acquired information to specify the content, cause, etc. of the error (hereinafter also referred to collectively as "error information").

The guidance output unit 102 predicts a setting item that should be changed in accordance with the error information in the case where an error is caused, and outputs guidance information that suggests changing the value of the setting item. The display control unit 103 performs control so as to display a screen related to the screen information 113 on a display surface (not illustrated) of the operation display section 12.

(Configuration of Error Information Table 111)

Next, various types of data stored in the storage section 11 will be described in detail. FIG. 2 illustrates an example of the error information table 111. As illustrated in FIG. 2, the error information table 111 stores pieces of information that specify an error, e.g. the type of the error, the error code for identifying the error, the cause of the error, an example of a countermeasure for resolving the error, and information on a screen to be output, in association with each other.

(Screen Information 113)

The screen information 113 is information on various types of screens to be displayed on the display surface of the operation display section 12 by the display control unit 103. The screen information 113 will be described with reference to FIGS. 3 to 12.

[First Error Display Screen]

FIG. 3 illustrates an example of a first error display screen. A first error display screen 7 is a screen indicating that an error is caused during execution of a Scan-To-PC process, and in particular is an example of an image to be displayed in the case where there occurs an event in which the read image may not be transmitted since a storage destination (hereinafter also referred to as a "folder") for storing the read image does not exist at a location (hereinafter also referred to as a "path") in the external device 3 designated as the transmission destination for the read image. The first error display screen 7 may be displayed as a pop-up on a principal setting screen 6 for setting various types of conditions for executing the Scan-To-PC process, for example. The path is an example of storage destination information.

As illustrated in FIG. 3, the first error display screen 7 includes, for example, a message 71 that indicates various types of information related to the error, a browsing button 72 for transitioning to a browsing screen 8 (see FIG. 4) to be discussed later, an end button 73 for ending an operation by closing the present screen, etc. The first error display screen 7 is an example of a transition screen for transitioning to the browsing screen 8. The browsing button 72 is an example of an operator.

The message 71 includes, for example, error occurrence information 711 indicating that an error is caused together with the content of the error, error code information 712 that indicates an error code, error cause information 713 that indicates the cause of the occurrence of the error, path information 714A that indicates the path of a folder in the external device 3 designated as the transmission destination for the read image, countermeasure information 715 that indicates an example of a measure for resolving the error, etc. The message 71 is an example of guidance information.

[Browsing Screen 8]

FIG. 4 illustrates an example of the browsing screen 8. The browsing screen 8 is a screen that displays the path of a folder in the external device 3 designated as the transmission destination for the read image and that has a function of changing the displayed path (hereinafter also referred to as "browsing"). The browsing screen 8 is an example of a change screen. The browsing screen 8 is displayed by operating the browsing button 72 on the first error display screen 7 discussed above.

The browsing screen 8 includes, for example, a path display field 81 that displays a path, a direct edit button 82 that allows display of an editing unit (e.g. a software keyboard etc.) that allows direct editing of the path by inputting characters etc., a move button 83 that allows movement to higher and lower levels in the displayed path, a list 84 of contents 840 such as files and folders stored directly under a folder indicated by the displayed path, etc.

The path display field 81 displays a character string that indicates the path of a designated folder. In the case where the designated folder does not exist, the path display field 81 may display, for example, the deepest location (hereinafter also referred to a "current path") of locations that exist before reaching the designated folder. By way of example, as illustrated in FIG. 4, in the case where "\\192.168.123.123\Share\Folder1\Folder1-9\WeeklyReportFolder" does not exist, the existing current path "\\192.168.123.123\Share\Folder1" may be displayed.

The list 84 may include icons 841 that indicate the type (such as folder and document) of the contents 840 as identification information. By way of example, a black square mark, for example, may be provided in the case where the content 840 indicates a folder, and a white square mark, for example, may be provided in the case where the content 840 indicates data such as a document. The icons 841 are each a figure that represents a function. However, the icons 841 may each include a character or a symbol, and may each be constituted of a character or a symbol alone. The shape of the icons 841 is not limited to the square.

[Second Error Display Screen 7]

Figure 5:
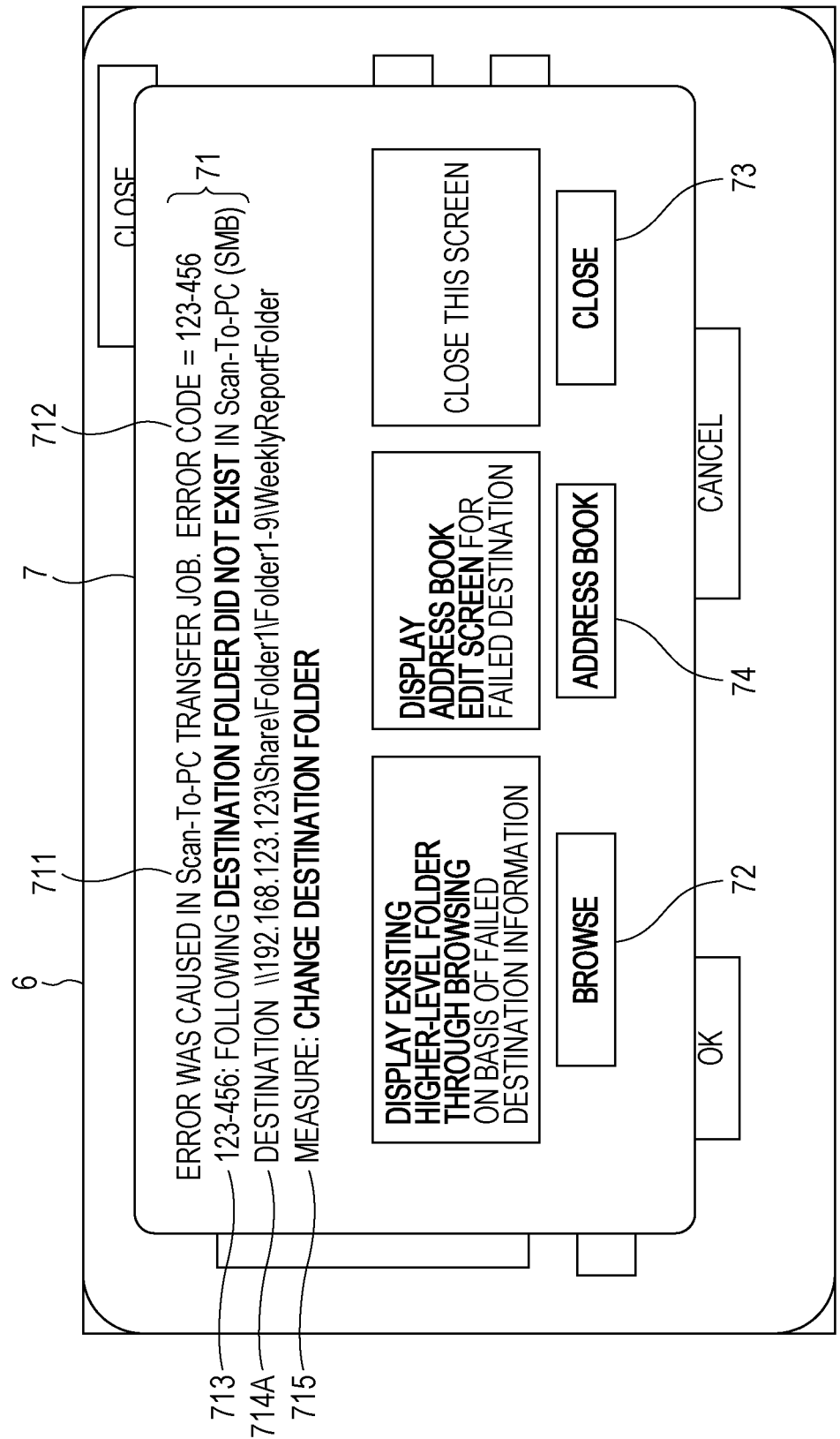
FIG. 5 illustrates an example of a second error display screen.

FIG. 5 illustrates an example of a second error display screen 7. As with the first error display screen 7, the second error display screen 7 is a screen indicating that an error is caused during execution of a Scan-To-PC process, and in particular is an example of an image to be displayed in the case where there occurs an event in which the read image may not be transmitted since a folder does not exist at a path in the external device 3 designated as the transmission destination for the read image. Differences from the first error display screen 7 will be principally described below.

As illustrated in FIG. 5, the second error display screen 7 further includes, in addition to the components of the first error display screen 7, an address book button 74 for transitioning to an address book edit screen 9 (see FIG. 6) to be discussed later. The second error display screen 7 is an example of a transition screen for transitioning to the address book edit screen 9. The address book button 74 is an example of an operator.

[Address Book Edit Screen 9]

Figure 6:
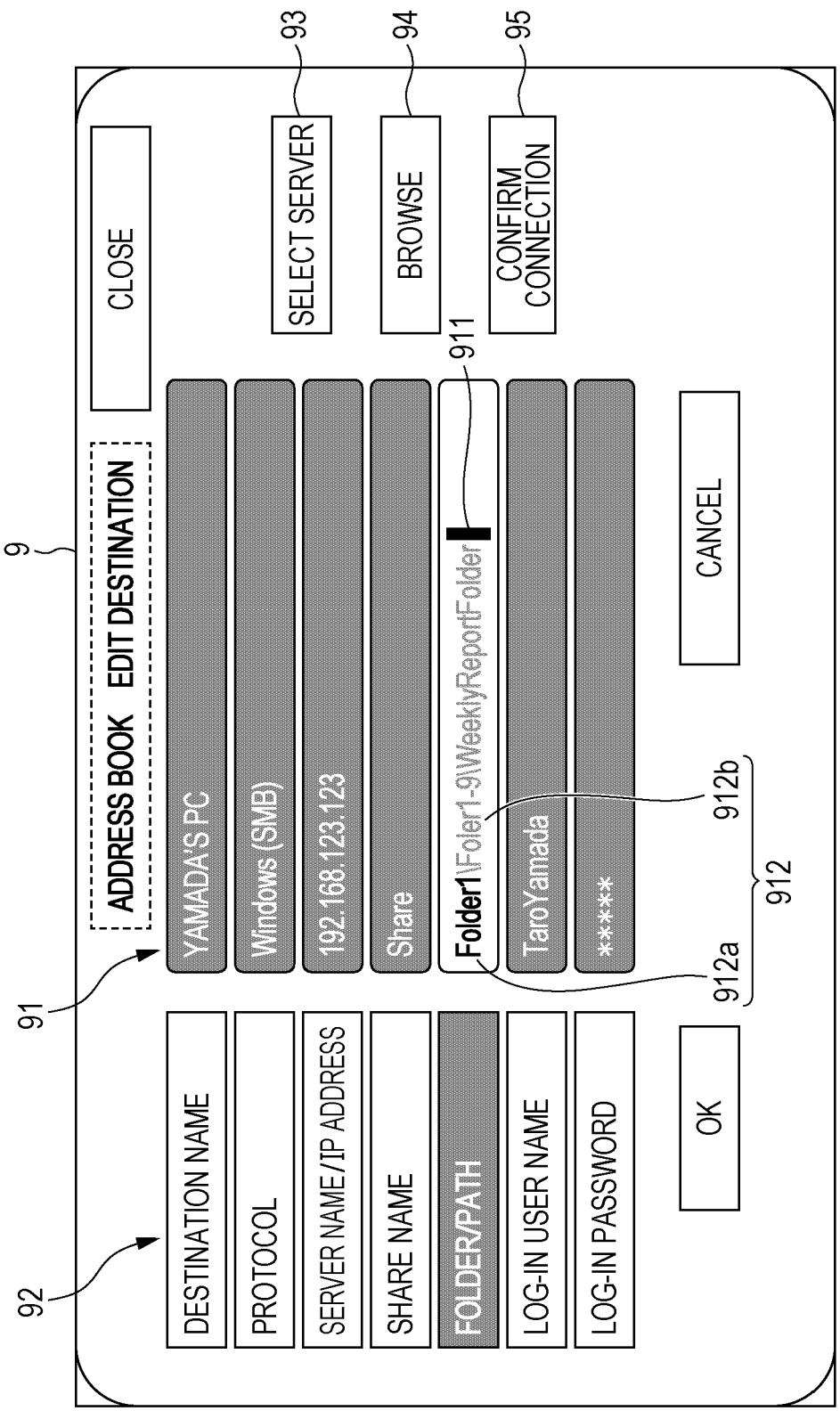
FIG. 6 illustrates an example of an address book edit screen.

FIG. 6 illustrates an example of the address book edit screen 9. The address book edit screen 9 is a screen for editing information on the transmission destination for the read image. The address book edit screen 9 is an example of a change screen. The address book edit screen 9 is displayed by operating the address book button 74 on the second error display screen 7.

The address book edit screen 9 includes a destination information display field 91 that displays various types of information (hereinafter also referred to as a "parameter") related to the external device 3 which is designated as the transmission destination, an item field 92 that indicates a setting item corresponding to the information which is displayed in each destination information display field 91, a server select button 93 that allows display of a screen for selecting a server device, a browse button 94 that allows display of the browsing screen 8 discussed above, a connection confirmation button 95 that allows confirmation as to whether or not a connection may be made to the path which is displayed in the destination information display field 91, etc.

Examples of the destination information display field 91 include a destination, that is, a name (hereinafter also referred to as a "destination name") provided to the external device 3 as the transmission destination, the communication scheme (hereinafter also referred to as a "protocol"), the name (hereinafter also referred to as a "server name") or the IP address of the server device, a folder name (hereinafter also referred to simply as a "share name") for a case where the folder is shared by a plurality of users, the path of the designated folder, a user name and a password for connecting (hereinafter also referred to as "logging in") to the external device 3 as the transmission destination or enabling use of (hereinafter also referred to as "accessing") the designated folder, etc.

The destination information display field 91 may display a display field, in which editable information is displayed, differently from the other display fields (i.e. display fields with non-editable information). Specifically, in the case where an error is caused since a designated folder is not found, a display field that displays the path of the folder may be displayed in a different display mode (e.g. the background of the display field is changed to a different color etc.) from display fields for the other information.

More specifically, as illustrated in FIG. 6, by way of example, the display field that displays the path of the folder may be displayed with a white background, and the other fields may be displayed with a gray background. The corresponding item field 92 may be displayed with a colored background. A cursor 911 is displayed in a display field being edited. Of a displayed path 912, an existing path 912a and a non-existing path 912b may be displayed differently. As illustrated in FIG. 6, by way of example, the non-existing path 912b may be displayed as grayed out. The existing path 912a is an example of a region that exists. The non-existing path 912b is an example of a region that does not exist.

[Third Error Display Screen 7]

Figure 7:
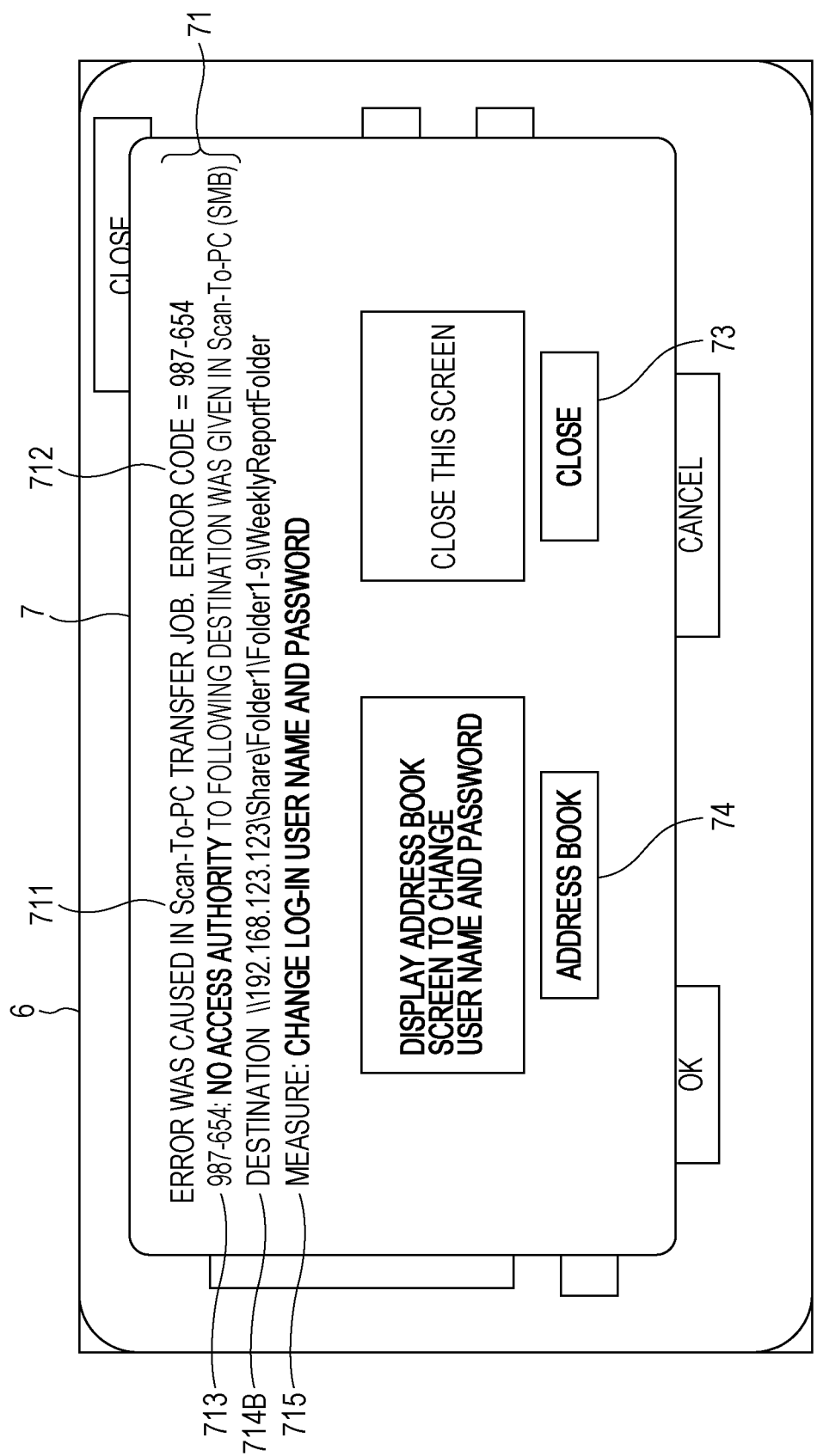
FIG. 7 illustrates an example of a third error display screen.

FIG. 7 illustrates an example of a third error display screen 7. The third error display screen 7 is a screen indicating that an error is caused during execution of a Scan-To-PC process, and in particular is an example of an image to be displayed in the case where there occurs an event in which the read image may not be transmitted since no access authority to the designated folder is given. Differences from the first error display screen 7 will be principally described below.

As illustrated in FIG. 7, the third error display screen 7 displays path information 714B on the folder, no access authority to which is given, in place of the path information 714A on the non-existing folder which is displayed on the first error display screen 7. The address book button 74 on the third error display screen 7 is associated with an access information setting screen 90 (see FIG. 8) to be discussed later. The third error display screen 7 is an example of a transition screen for transitioning to the address book edit screen 9, and is an example of a transition screen for transitioning to the access information setting screen 90.

[Access Information Setting Screen 90]

Figure 8:
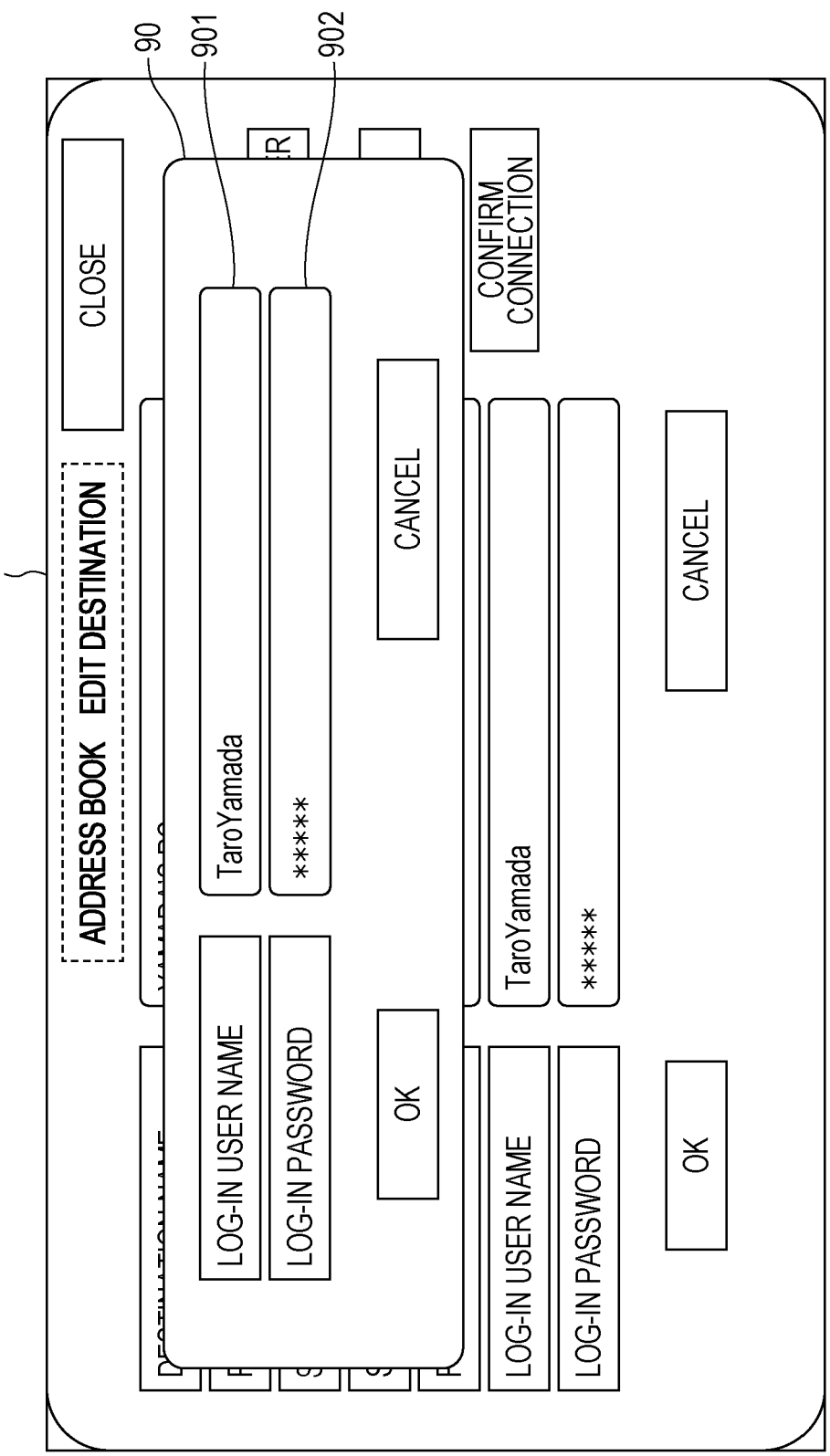
FIG. 8 illustrates an example of an access information setting screen.

FIG. 8 illustrates an example of the access information setting screen 90. The access information setting screen 90 is a screen that allows input of a user name and a password for accessing the designated folder. The user name and the password are an example of authentication information. The access information setting screen 90 is displayed by operating the address book button 74 on the third error display screen 7.

As illustrated in FIG. 8, the access information setting screen 90 includes a user name input field 901 that allows input of a user name, a password input field 902 that allows input of a password, etc. The access information setting screen 90 may be displayed as a pop-up on the address book edit screen 9, for example. The user name input field 901 and the password input field 902 are an example of an input field.

[Fourth Error Display Screen 7]

Figure 9:
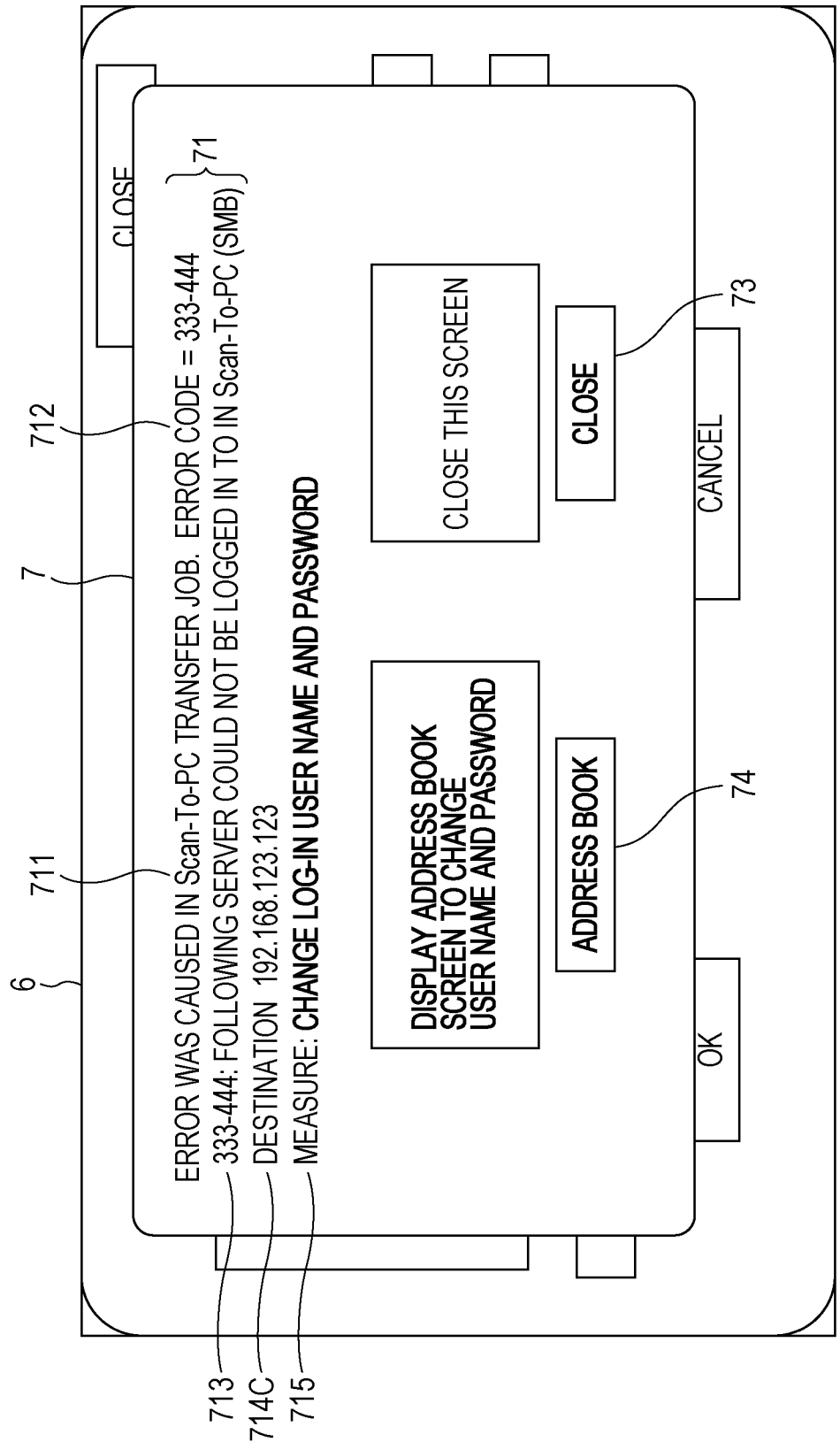
FIG. 9 illustrates an example of a fourth error display screen.

FIG. 9 illustrates an example of a fourth error display screen 7. The fourth error display screen 7 is a screen indicating that an error is caused during execution of a Scan-To-PC process, and in particular is an example of an image to be displayed in the case where there occurs an event in which the read image may not be transmitted since the external device 3 which is designated as the transmission destination for the read image may not be logged in to. The fourth error display screen 7 is an example of a transition screen for transitioning to the address book edit screen 9. Differences from the first error display screen 7 will be principally described below.

As illustrated in FIG. 9, the fourth error display screen 7 displays IP address information 714C on the external device 3 (e.g. a server device) which is not authorized to log in, in place of the path information 714A on the first error display screen 7. The IP address is information with four numbers with a value of 0 to 255 separated by a dot.

[Fifth Error Display Screen 7]

Figure 10:
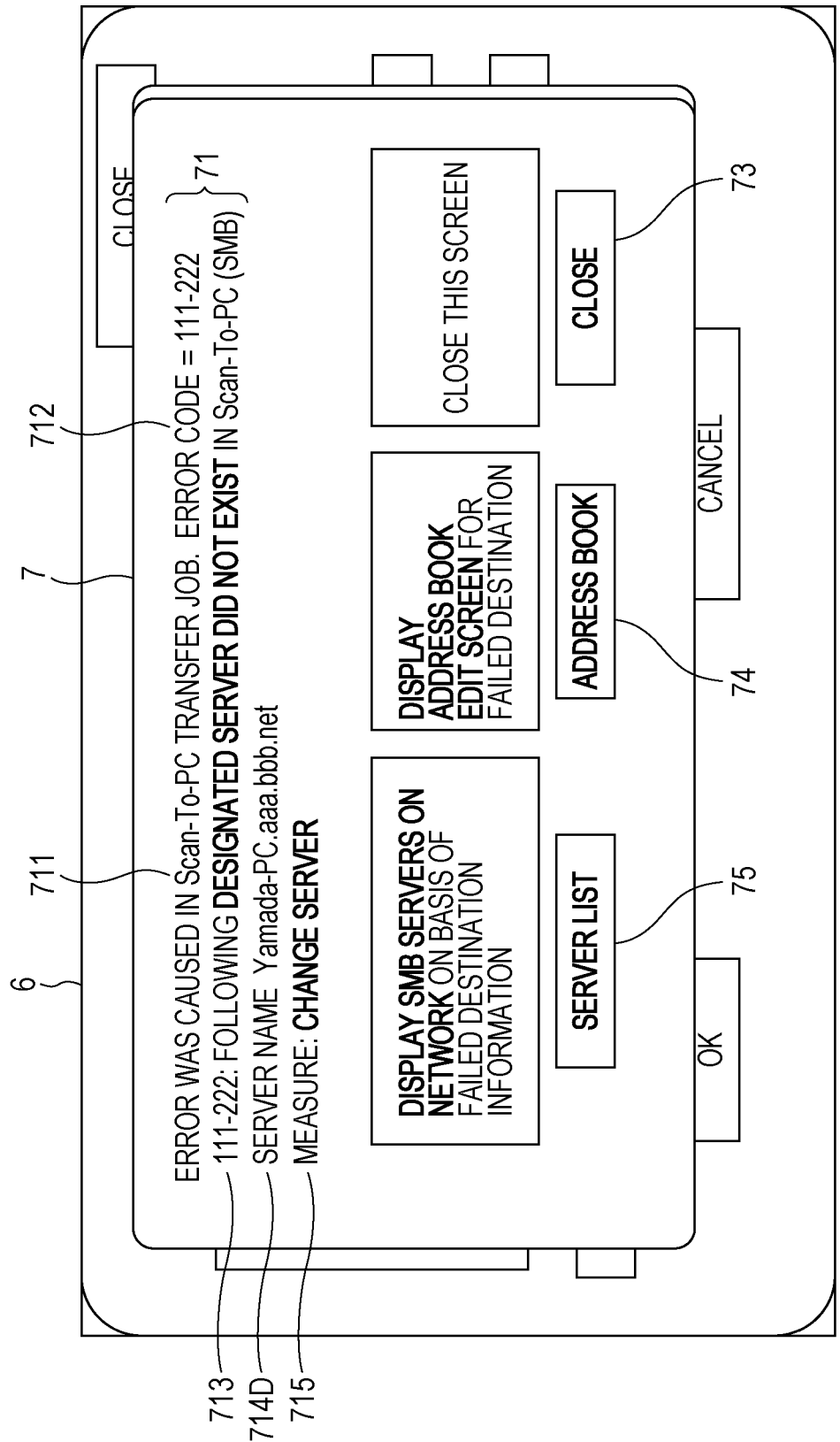
FIG. 10 illustrates an example of a fifth error display screen.

FIG. 10 illustrates an example of a fifth error display screen 7. The fifth error display screen 7 is a screen indicating that an error is caused during execution of a Scan-To-PC process, and in particular is an example of an image to be displayed in the case where there occurs an event in which the read image may not be transmitted since the external device 3 which is designated as the transmission destination for the read image is not connectable. Differences from the first error display screen 7 will be principally described below.

The term "not connectable" refers to a state in which electrical or signal communication with the external device 3 may not be made since the external device 3 does not exist, the external device 3 is turned off, the external device 3 is out of order, identification information for identifying the server device such as a name or an IP address has been changed, etc.

As illustrated in FIG. 10, the fifth error display screen 7 displays server name information 714D that indicates the name of the external device 3 (e.g. a server device) which is not connectable, in place of the path information 714A on the first error display screen 7. The fifth error display screen 7 includes a server field button 75 for displaying a server list screen 8A (see FIG. 11) to be discussed later. The address book button 74 on the fifth error display screen 7 is associated with an address book edit screen 9 illustrated in FIG. 12. The fifth error display screen 7 is an example of a transition screen for transitioning to the server list screen 8A, and is an example of a transition screen for transitioning to the address book edit screen 9. The server field button 75 is an example of an operator.

[Server List Screen 8A]

Figure 11:
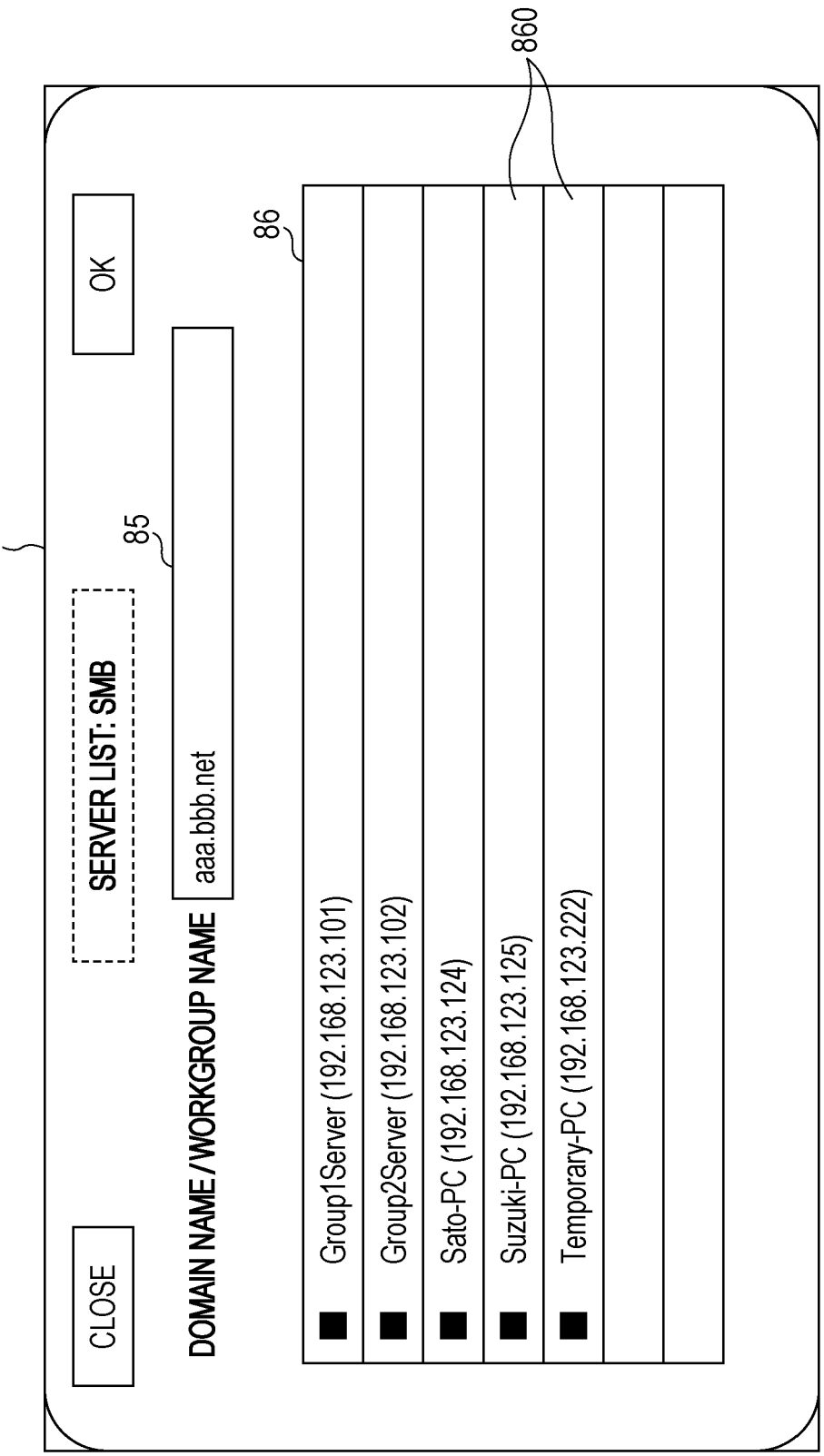
FIG. 11 illustrates an example of a server list screen.

FIG. 11 illustrates an example of the server list screen 8A. The server list screen 8A is a screen that displays a list of server devices and that allows selection of a server device. The server list screen 8A is an example of a change screen.

The server list screen 8A includes a server name display field 85 that displays the name of a server device as the external device 3, a server list 86 that indicates a list of server devices connected to the network 5, etc. The server name display field 85 displays a domain name or a group name, for example. The server list 86 displays server information 860 that indicates server devices.

Figure 12:
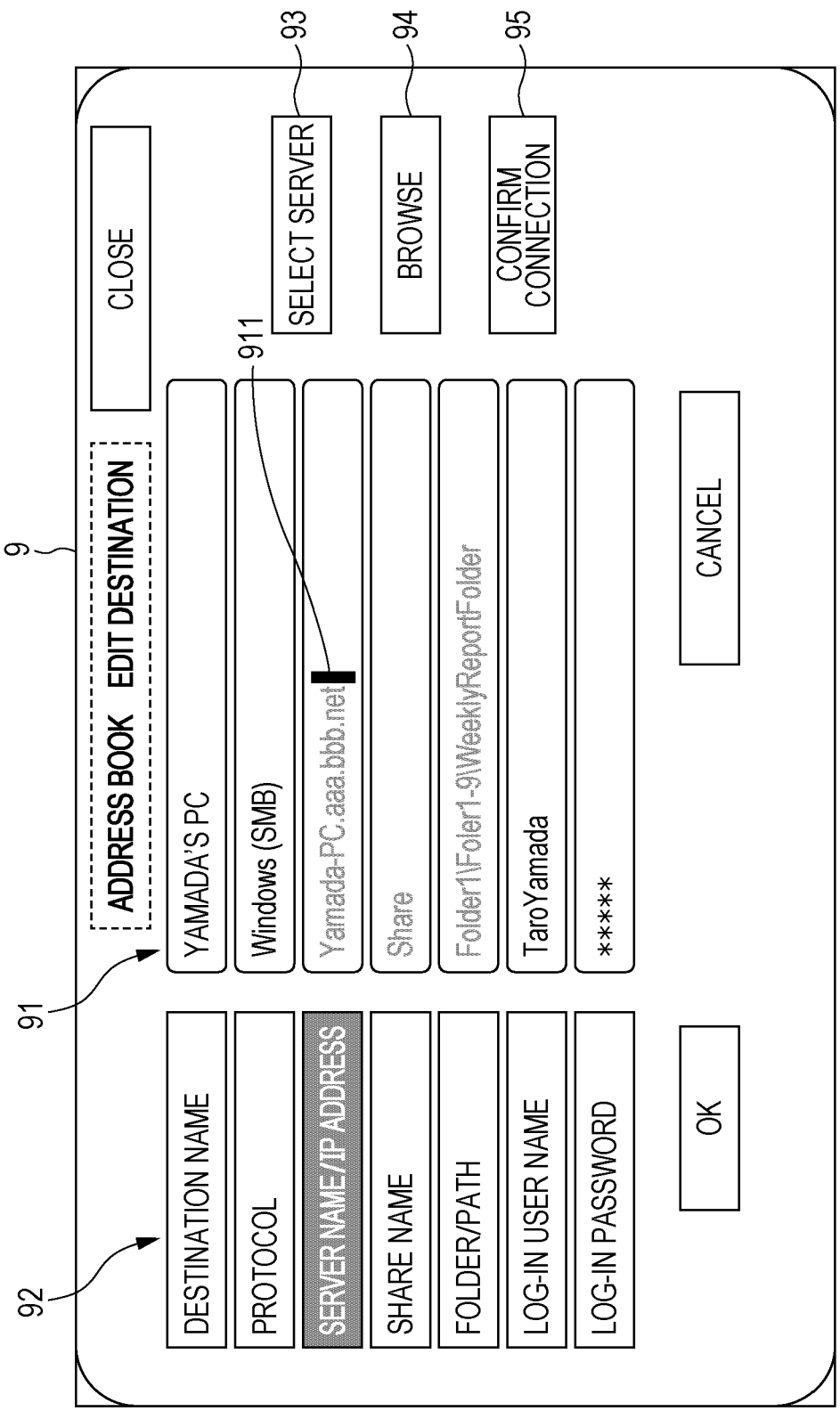
FIG. 12 illustrates an example of an address book edit screen.

FIG. 12 illustrates an example of the address book edit screen 9. The address book edit screen 9 illustrated in FIG. 12 is displayed by operating the address book button 74 on the fifth error display screen 7. In FIG. 12, compared to the address book edit screen 9 illustrated in FIG. 6, the background of a display field for a server name and an IP address to be edited is displayed in a different color (e.g. white) from the color (e.g. gray) of the background of the other display fields, and the corresponding item field 92 is displayed as colored.

Operation According to Exemplary Embodiment

Next, an example of operation of the information processing apparatus 1 will be described with reference to FIG. 13. FIG. 13 is a flowchart illustrating an example of operation of the information processing apparatus 1 illustrated in FIG. 1. When an error is caused during execution of the Scan-To-PC process (S1), the analysis unit 101 analyzes the error (S2) by acquiring information from the external device 3 in which the error is caused.

In the case where the error is solvable by browsing (S3: Yes), and in the case where the server device is accessible (S4: Yes), the display control unit 103 performs control so as to display a transition screen for transitioning to the browsing screen 8 (see FIG. 4), that is, the first error display screen 7 (see FIG. 3) (S5).

In the case where the error is solvable by browsing (S3: Yes), and in the case where the server device is not accessible (S4: No), the display control unit 103 performs control so as to display a transition screen for transitioning to the server list screen 8A (see FIG. 11), that is, the fifth error display screen (see FIG. 10) (S6).

In the case where the error is not solvable by browsing (S3: No), and in the case where the error is solvable by making a correction (hereinafter also referred to simply as a "parameter correction") of information related to a destination (hereinafter also referred to as a "Scan-To-PC destination") set in the Scan-To-PC process (S7: Yes), the display control unit 103 performs control so as to display a transition screen for transitioning to the address book edit screen 9 (see FIGS. 6 and 12), that is, the second error display screen (see FIG. 5), the third error display screen (see FIG. 7), the fourth error display screen 7 (see FIG. 9), or the fifth error display screen 7 (see FIG. 10) (S8).

In the case where a parameter of the Scan-To-PC destination that should be corrected is successfully specified (S9: Yes), the display control unit 103 makes the parameter that should be corrected on the address book edit screen 9 editable (S10). Specifically, the display control unit 103 performs control so as to display the cursor 911 in a display field related to the parameter that should be corrected, and so as to display the display field and the corresponding item field 92 in a different display mode.

In the case where a parameter of the Scan-To-PC destination that should be corrected is not successfully specified (S9: No), the display control unit 103 performs control so as to display another appropriate solution (S11). The determinations made in steps S3, S4, S7, and S9 discussed above are made by the control section 10 (e.g. the guidance output unit 102 etc.) in accordance with criteria determined in advance.

While an exemplary embodiment of the present disclosure has been described above, exemplary embodiments of the present disclosure are not limited to the exemplary embodiment described above, and a variety of modifications and implementations may be made without departing from the scope and spirit of the present disclosure.

The various units of the control section 10 may be partially or wholly constituted of a hardware circuit such as a Field Programmable Gate Array (FPGA), an Application Specific Integrated Circuit (ASIC), etc.

Some of the constituent elements of the exemplary embodiment described above may be omitted or changed without departing from the scope and spirit of the present disclosure. Additions, deletions, changes, interchanges, etc. may be made to the steps of the flow according to the exemplary embodiment described above without departing from the scope and spirit of the present disclosure. The program used in the exemplary embodiment described above may be provided as recorded in a computer-readable recording medium such as a CD-ROM, or may be stored in an external server such as a cloud server to be used via a network.

What is claimed is:

1. An information processing apparatus comprising:
   a transmission unit that transmits an object to a particular external device connected to the apparatus; and
   a guidance output unit that predicts a setting item that should be changed in a case where the object is not transmitted to the particular external device, and that outputs guidance information that suggests changing the setting item,
   wherein the guidance output unit further outputs, together with the guidance information, storage destination information that indicates a storage destination in the particular external device in a case where the object is not transmitted to the particular external device since a designated storage destination does not exist in the particular external device, and
   wherein the guidance output unit outputs a region that does not exist in the particular external device, of the storage destination information, in a different display mode from a region that exists in the particular external device.

2. The information processing apparatus according to claim 1,
   wherein the guidance output unit further outputs, together with the guidance information, an operator that allows display of a change screen for changing the setting item.

3. The information processing apparatus according to claim 2,
   wherein the guidance output unit further outputs, together with the guidance information, an operator that allows display of the change screen for changing information that is required to use the storage destination as the setting item in a case where the object is not transmitted to the particular external device since the particular external device or the designated storage destination in the particular external device is not available.

4. The information processing apparatus according to claim 3,
   wherein the guidance output unit outputs the change screen including an input field that allows input of authentication information that includes identification information for identifying a user.

5. A non-transitory computer readable medium storing a program causing a computer to execute a process, the process comprising:
   transmitting an object to a particular external device;
   predicting a setting item that should be changed in a case where the object is not transmitted to the particular external device; and
   outputting guidance information that suggests changing the setting item,
   wherein the outputting further outputs, together with the guidance information, storage destination information that indicates a storage destination in the particular external device in a case where the object is not transmitted to the particular external device since a designated storage destination does not exist in the particular external device, and
   wherein the outputting outputs a region that does not exist in the particular external device, of the storage destination information, in a different display mode from a region that exists in the particular external device.

6. An information processing apparatus comprising:
   transmission means for transmitting an object to a particular external device connected to the apparatus; and
   guidance output means for predicting a setting item that should be changed in a case where the object is not transmitted to the particular external device, and for outputting guidance information that suggests changing the setting item,
   wherein the guidance output means is further for outputting, together with the guidance information, storage destination information that indicates a storage destination in the particular external device in a case where the object is not transmitted to the particular external device since a designated storage destination does not exist in the particular external device, and
   wherein the guidance output means is further for outputting a region that does not exist in the particular external device, of the storage destination information, in a different display mode from a region that exists in the particular external device.

* * * * *